(No Model.)
B. F. SWEET.
NUT LOCK.
No. 515,848. Patented Mar. 6, 1894.
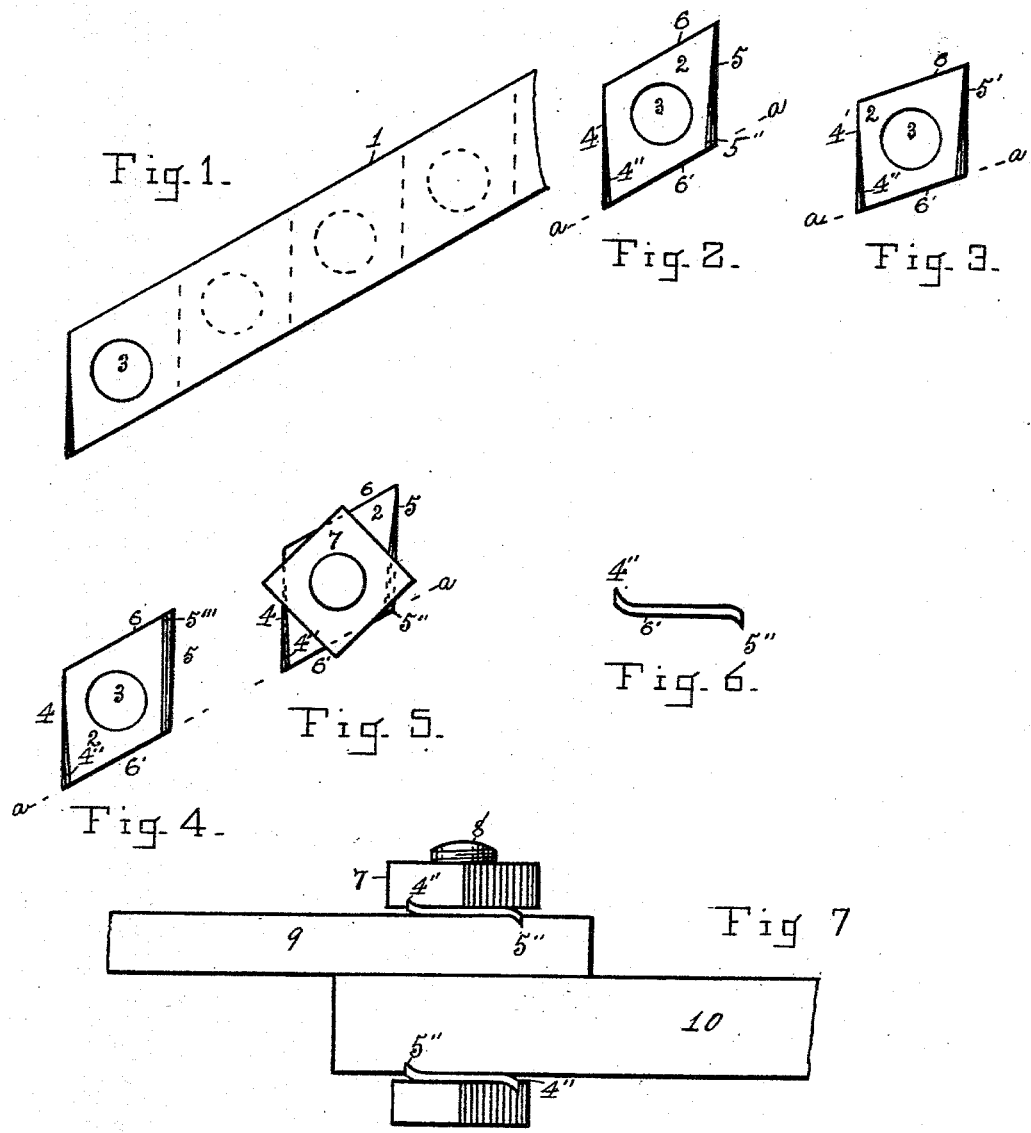
Witnesses
E. M. Albee
Heman Miller
Inventor
Benjamin F. Sweet.
By G. H. Albee
his Atty.

UNITED STATES PATENT OFFICE.

BENJAMIN F. SWEET, OF FOND DU LAC, WISCONSIN.

NUT-LOCK.

SPECIFICATION forming part of Letters Patent No. 515,848, dated March 6, 1894.

Application filed November 25, 1893. Serial No. 492,004. (No model.)

*To all whom it may concern:*

Be it known that I, BENJAMIN F. SWEET, a citizen of the United States, residing at Fond du Lac, in the county of Fond du Lac and State of Wisconsin, have invented a new and useful Improvement in Nut-Locking Washers, of which the following is a specification.

My invention relates to a washer consisting of a plate cut from a thin strip of metal into a four sided figure, preferably of a diamond shape, and having centrally of it a perforation for a bolt, a part of its edges being straight and plain and the remaining ones being bent over transversely of the plate and forming lips which project from the face of the washer upon opposite sides of it, said lips being adapted when the washers are properly arranged upon a bolt to both hold the washer from turning around the bolt, and to hold said bolt from turning within the washer, when a nut is being screwed down upon the bolt, and also, to hold the nut from turning backward upon the bolt and becoming loose; and the object of my improvement is, to provide a washer which is easy to manufacture, which requires no complicated machinery for its formation, is easy of application, can be quickly removed from a bolt, is an effectual nut and bolt lock, and is capable of repeated use with but slight, if any, lessening of its nut, or bolt locking qualities. I attain these objects in the manner herein described, and as shown in the accompanying drawings, in which—

Figure 1 is a plan view of a strip of metal from which the washers can be cut, a perforation for a bolt being in the washer at the left hand of the strip and perforations for the remaining washers and the line upon which they are to be cut being indicated by dotted lines. Fig. 2 is a plan of the washer; Fig. 3, a modification in its form; Fig. 4, a modification in the form of one of its lips; Fig. 5, a plan of the washer as in Fig. 2, with a nut in position thereon; Fig. 6, an edge view of the washer along the line *a, a*, of Figs. 2, 3, 4 and 5, and Fig. 7, an edge view of two pieces of material bolted together and having a washer as herein described between the head and nut of the bolt and said pieces.

Similar figures of reference indicate like parts in the several views.

1 indicates a strip of metal from which the washers may be cut; 2, the completed washer; 3, the bolt hole therein; 4, an edge of the washer having a lip, 4″, for engaging with a bolt head or its nut; 5, the opposite edge having a lip 5″, for engaging with the material upon which the washer may be placed for use; 6, and 6′, the two remaining and plain edges of the washer; 7, a nut; 8, a bolt; 9 and 10, two pieces of material which are bolted together between the head of the bolt 8 and the nut 7.

In the modification of the form of the washer, 4′ and 5′, indicate the sides which are cut in forming the washer from the plate 1, and for the modified form of lip, 5‴, represents said lip.

In manufacturing the washers a strip of steel of the desired width and thickness is taken, and it may first be perforated for a bolt, or the hole may be punched by the same movement of the washer cutter which severs the washer from the strip of metal, the washer having four edges 4, 5, 6 and 6′, and is preferably of a diamond shape, although it may be nearly in the form of a square. The edge 4 has a lip 4″, formed thereon, which projects from that face of the washer which is intended for contact with the nut for about two thirds of the length of said edge, it commencing at a point about one third of the distance from an obtuse to an acute angle and increasing its projection gradually from its commencing point to said acute angle. The edge 5 has a lip 5″, somewhat similar to the lip upon the edge 4, excepting that it projects from the opposite face of the washer, as shown in Fig. 6, and it may extend the entire length of said edge and project a uniform amount throughout said length, as shown in Fig. 4, or as it is shown in Figs. 2, 3 and 5, its projection may commence at the acute angle with zero, and increase gradually until reaching the obtuse angle. The extent to which this lip projects along said edge is to be governed by the use to be made of the washer, it being for use upon a soft, or easily penetrated body the lip being longer than if for use upon a hard, and not easily penetrated one. These lips may be formed in the operation of cutting the washers from the strip of metal, by having the shear and die of the proper form, or they may be furnished with the required sharp edge at a subsequent operation. They should be made sharp along their entire length with a gradual rise from the body of the washer to said edges, whereby, in securing a nut upon a bolt by turning it down upon the washer the corners of said nut will, when approaching the lip 4'' from the body of the washer, easily pass over said lip until the nut is sufficiently tight, when upon any attempt to turn the nut backward, said lip will cut into the nut and prevent its farther backward movement and thereby securely lock the nut upon the bolt.

The screwing down of the nut upon the washer will force the sharp edge of the lip 5'' upon the opposite face of the washer from the nut, into the surface of the material upon which the washer may be placed, and thereby prevent said washer from turning around upon the bolt during the operation of screwing down the nut.

When bolting two or more articles together it is often necessary to hold the bolt from turning while screwing a nut upon it. By placing one of these washers upon the bolt with the lip 4'', next to its head, the act of screwing on of the nut will force the lip 5'', into the body of the article to be bolted and prevent the washer from turning and the lip 4'', into the head of the bolt and securely hold the bolt from turning around within the articles to be bolted together. Fig. 7 illustrates this application of the washer.

A suitable degree of temper should be given to the lips for preserving the necessary sharpness thereof.

In screwing the nut upon the bolt its corners will slide over the lip 4'' quite easily with but a slight tendency to turn the washer in the same direction until the nut is sufficiently tight, said tendency of the washers turning being lessened, or entirely obviated by the penetration of the lip 5'' into the material upon which the washer may be placed. These lips being tempered the washers are adapted for both wood and metallic surfaces. When it is desired to remove the nut, a slight additional force being applied to the nut, both nut and washer can be turned backward until the nut is clear of the washer, when each will be free to be removed in the usual manner.

The washers in all of the figures are in the position required for bolts having a right hand thread, but it will be evident that the lips can be as easily arranged for bolts having a left, as for a right hand thread.

In consequence of the greater convenience in cutting the washers from a strip of metal of the desired width for the washer than from a wide sheet, the lips 4'' and 5'' are represented as being upon opposite, instead of adjacent edges, which arrangement is not essential, as the washer holding qualities may be nearly, or quite as effective with said lips upon adjacent as upon opposite edges of the washer.

Having described my invention, what I claim, and desire to secure by Letters Patent, is—

1. A washer consisting of a thin plate of metal of a diamond shape and being centrally perforated for receiving a bolt, two of its edges being straight and plain, and of its remaining ones, one edge having a lip extending along it from the commencement of said lip at a point approximately one third of the distance from an obtuse to an acute angle of the washer and projecting from the face thereof, said projection having a gradual increase from its commencing point to the latter angle, and the lip being adapted when in contact with a bolt head or nut to penetrate said parts when a nut is screwed upon the bolt, and to thereby hold the bolt from turning while screwing down the nut, or to hold said nut from loosening on the bolt, and the remaining edge having a lip projecting from the opposite face of the washer, said lip being adapted to be forced by the screwing down of a nut upon said bolt, into the material upon which said washer may be placed, and to thereby prevent the washer from turning around the bolt in screwing a nut thereon, substantially as described.

2. A washer consisting of a thin plate of metal of a diamond shape, and being centrally perforated for receiving a bolt, two of its edges being straight and plain and of its remaining ones, one edge having a lip extending along it from its commencing point at approximately one third of the distance from an obtuse to an acute angle of the washer, and projecting from the face thereof, said projection having a gradual increase from its commencing point to the latter angle, and the lip being adapted when in contact with a bolt head or nut to penetrate said parts when a nut is screwed upon the bolt, and to thereby hold the bolt from turning while screwing down the nut, or to hold said nut from loosening on the bolt, and the remaining edge having a lip projecting from the opposite face of said washer, said projection having a gradual increase from zero at an acute angle toward an obtuse angle of said washer, and being adapted to be forced by the screwing down of a nut upon said bolt into the material upon which said washer may be placed, and to thereby prevent the washer from turning around the bolt in screwing a nut thereon, substantially as set forth and shown.

B. F. SWEET.

Witnesses:
WALDO SWEET,
N. C. GIFFIN.